United States Patent Office 2,740,801
Patented Apr. 3, 1956

2,740,801

ALKYLBENZYL TRICHLOROSILANES

Clinton W. MacMullen, Fayetteville, and Alfred Marzocchi, Camillus, N. Y., assignors to Cowles Chemical Company, Cleveland, Ohio, a corporation of Ohio No Drawing. Application May 14, 1952,
Serial No. 287,811

6 Claims. (Cl. 260—448.2)

This invention relates to organo-halo-silanes and more particularly to a novel group of alkyl aralkyl tricholorosilanes that have been found particularly useful as intermediates in the production of certain hydrolysis products that exhibit interesting and useful wetting and detergent properties. The present application is a continuation-in-part of our prior application Serial No. 117,064, filed September 21, 1949, now abandoned.

In U. S. Patent 2,587,636, issued to C. W. MacMullen, it is disclosed that a novel group of organosilicon compounds comprising the mono-organo-silane triolates and siloxanolates possess the property of significantly lowering the surface tension of aqueous solutions in which they are dissolved and also improving the wetting properties of the solutions. It is further disclosed that such silanolates and siloxanolates may be prepared by the alkaline hydrolysis of the organo-trihalo-silanes.

We have found that the effect of the products of the alkaline hydrolysis of organo-halo-silanes in lowering the surface tension and improving the wetting properties of aqueous solutions in which they are dissolved varies with the character of the organic substituent. More particularly, we have discovered certain groups of organotrihalo-silanes which, when hydrolyzed in accordance with methods disclosed in Patent No. 2,587,636, referred to above, produce alkaline hydrolysis products that are unusually effective in lowering the surface tension and improving the wetting properties of aqueous solutions in which they are dissolved. The present application is directed to one such group of trihalo silanes.

The products of the present invention comprise mono-organo trichloro-silanes wherein the organo group is an alkyl benzyl radical. As shown by the data given in Table I below, the alkaline hydrolysis products of the alkyl benzyl trichlorosilanes give a surface tension lowering effect that is significantly greater than that of the hydrolysis products of certain other trichloro-silanes which are closely related in a chemical sense to the alkyl benzyl derivatives and hence might be expected to produce a comparable effect.

The data of Table I were obtained by hydrolyzing in concentrated aqueous alkali a mono-organo trichlorosilane having the organo radical indicated in the first column of the table. In each case the solution concentration was adjusted to make the organo-trihalo silane hydrolysis products 1% by weight of the solution so that the results can be directly compared. The second column of the table gives the surface tensions of the solutions. Surface tension was measured using a Cenco Du Nouy tensiometer.

TABLE I

| Organo Substituent | Surface Tension (in dynes/cm.) |
|---|---|
| $C_6H_5$ | 49 |
| $C_6H_5CH_2$ | 50.6 |
| $CH_3C_6H_4CH_2$ | 39.3 |
| $(C_2H_5)_2C_6H_3CH_2$ | 35 |
| $C_5H_{11}C_6H_4CH_2$ | 37 |
| $C_9H_{19}C_6H_4CH_2$ | 29 |

From the data of Table I it is apparent that contrary to what would be expected the phenyl and unsubstituted benzyl derivatives both give surface tension values at least about 25% higher than the values for the alkylbenzyl derivatives. Thus the alkylbenzyl derivatives are critically differentiated from the unsubstituted benzyl derivative, as well as from the phenyl derivative, in terms of their surface tension lowering effects.

The products of the present invention may be conveniently prepared by making use of the well-known Grignard reaction as described more fully hereafter. In cases where Grignard reagent formation is sluggish, particularly as was noted for the higher molecular weight compounds, it is advantageous to form the organo lithium compound from the organohalide and couple this with silicon tetrachloride. In order to point out more completely the nature of the invention, the following specific examples are given of trichloro-silanes that fall within the general formula given above. It is to be understood that these examples are illustrative only and other compounds falling within the defined group may be similarly prepared and the methods described may be modified in various ways to adapt the methods and products to various uses.

*Example 1.—Methylbenzyl trichlorosilane*

A solution was prepared containing 124 grams chloromethyl toluene and 675 cc. anhydrous ethyl ether and 25 cc. of this solution added to a flask containing 21.5 grams magnesium turnings and 25 cc. anhydrous ethyl ether. As the reaction started a greeen color developed and the remaining chloromethyl toluene was added slowly with stirring to form a methylbenzyl Grignard reagent.

In a second flask were placed 190.5 grams silicon tetrachloride and 700 cc. anhydrous ethyl ether. The Grignard reagent from the first flask was added slowly with stirring and so much precipitate formed that the mixture was diluted by the addition of 1000 cc. anhydrous ethyl ether. The mixture stood several days. The reaction product was filtered, stripped of solvent and excess silicon tetrachloride and distilled in vacuo. Methylbenzyl trichlorosilane was obtained as a fraction boiling between 115° C. and 120° C. at 12 mm.

*Example 2.—Ethylbenzyl trichlorosilane*

A solution was prepared containing 90.4 grams chloromethyl ethylbenzene and 393 cc. anhydrous ethyl ether, and 25 cc. of this solution added to a flask containing 14 grams magnesium turnings and 25 cc. anhydrous ethyl ether. A vigorous reaction took place and the remaining chloromethyl ethyl benzene solution was added during two hours with stirring to form an ethylbenzyl Grignard reagent.

In a second flask were placed 124 grams silicon tetrachloride and 408 cc. anhydrous ethyl ether. The Grignard reagent from the first flask was added dropwise during 20 minutes and agitation was continued 1½ hours, after which the mixture stood several days. The mixture was stirred and refluxed two hours more and again stood several days. The reaction product was filtered, stripped of solvent and excess silicon tetrachloride and distilled in vacuo. Ethylbenzyl-trichlorosilane was obtained as a fraction boiling between 117° C. and 124° C. at 10 mm.

*Example 3.—Diethylbenzyl trichlorosilane*

A flask was charged with 24.1 grams magnesium turnings and 50 cc. anhydrous ethyl ether. A solution was prepared containing 182.7 grams diethylbenzyl chloride in 650 cc. anhydrous ethyl ether, and 50 cc. of this solution added to the flask. The reaction was started by inoculation with a few pieces of etched magnesium and the remaining diethylbenzyl chloride solution added during one hour with stirring to form a diethylbenzyl Grignard reagent.

A second flask was charged with 212.5 grams silicon tetrachloride and 700 cc. anhydrous ethyl ether. The Grignard reagent from the first flask was added slowly with stirring and the mixture stirred and allowed to stand three days. The product was filtered, stripped of solvent and excess silicon tetrachloride and distilled in vacuo. Diethylbenzyl trichlorosilane was obtained as a fraction boiling between 140° C. and 160° C. at 17 mm.

*Example 4.—Amylbenzyl trichlorosilane*

A reaction flask was charged with 24.3 grams of magnesium turnings and 50 cc. of anhydrous ethyl ether. A solution was prepared containing 196.5 grams of amylbenzyl chloride in 650 cc. of anhydrous ethyl ether and 60 cc. of this solution added to the reaction flask. The reaction was started by inoculation with an amylbenzyl Grignard reaction mixture. The remainder of the halide-ether solution was added slowly keeping the reaction well under control over a period of two hours.

A second reaction flask was charged with 221 grams of silicon-tetrachloride and 1080 cc. of anhydrous ethyl ether. The Grignard reagent from the first flask was added dropwise. The reaction proceeded very rapidly and was exothermic. Hence, the Grignard reagent had to be added slowly to keep the reaction under control. A considerable amount of white precipitate was formed during this reaction.

The reaction product was filtered, stripped of solvent and excess silicon tetrachloride and distilled in vacuo. The amylbenzyl trichlorosilane was recovered as a fraction boiling between 133° C. and 136° C. at 6 mm.

*Example 5.—Nonylbenzyl trichlorosilane*

A solution of 151 grams nonylbenzyl chloride in 400 cc. anhydrous ethyl ether was added slowly with stirring to a flask containing 14.4 grams magnesium turnings and 100 cc. anhydrous ethyl ether. The reaction product was a nonylbenzyl Grignard reagent.

In a second flask were placed 127.5 grams silicon tetrachloride in 500 cc. anhydrous ethyl ether. The Grignard reagent from the first flask was added slowly with stirring and the mixture allowed to stand for some time. The reaction product was filtered, stripped of solvent and excess silicon tetrachloride and distilled in vacuo. Nonylbenzyl trichlorosilane was obtained as a fraction boiling between 165° C. and 170° C. at 1 mm.

The exceptional surface tension lowering effect of the hydrolysis products of the present compounds appears to persist as the length of the alkyl group or groups on the benzyl nucleus is increased. However, it will ordinarily not be desirable to use alkyl groups containing more than 18 carbon atoms because of the difficulty of preparing such compounds. Accordingly the preferred length of the alkyl group is 1 to 18 carbon atoms.

Since many embodiments might be made of the present invention and since many changes might be made in the embodiment disclosed herein, it is to be understood that the foregoing description is to be interpreted as illustrative only and not in a limiting sense.

We claim:

1. As a new composition of matter, an alkylbenzyl trichlorosilane having at least one alkyl substituent on the benzyl nucleus containing from 1–18 carbon atoms.

2. As a new composition of matter, methylbenzyl trichlorosilane.

3. As a new composition of matter, ethylbenzyl trichlorosilane.

4. As a new composition of matter, diethylbenzyl trichlorosilane.

5. As a new composition of matter, amylbenzyl trichlorosilane.

6. As a new composition of matter, nonylbenzyl trichlorosilane.

References Cited in the file of this patent

UNITED STATES PATENTS

| | | |
|---|---|---|
| 2,527,233 | Sowa | Oct. 24, 1950 |
| 2,587,636 | MacMullen | Mar. 4, 1952 |
| 2,612,510 | Hatcher | Sept. 30, 1952 |
| 2,618,646 | Hatcher | Nov. 18, 1952 |